Patented Sept. 24, 1946

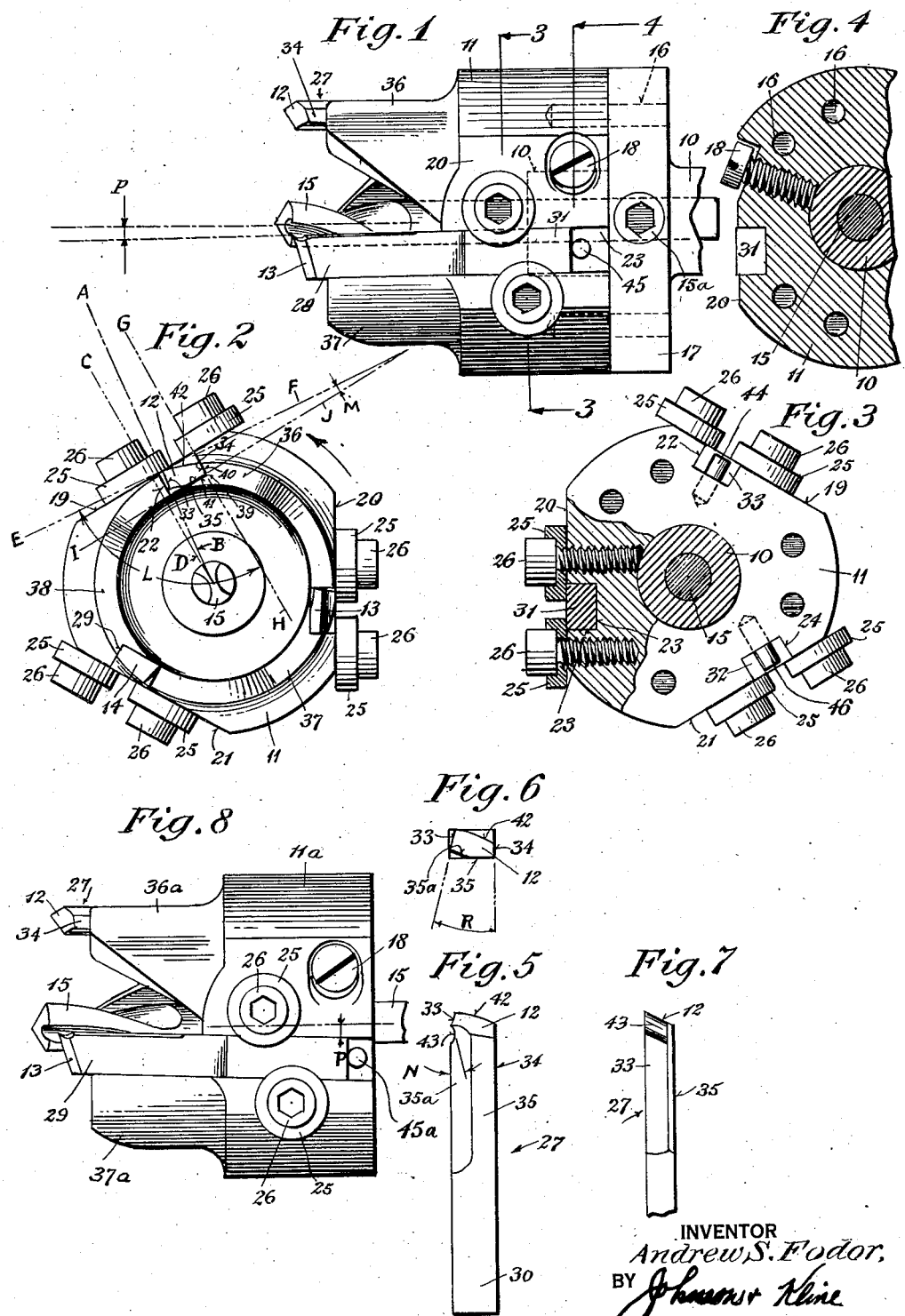

2,408,257

UNITED STATES PATENT OFFICE 2,408,257

ROTARY CUTTER

Andrew S. Fodor, South Norwalk, Conn.

Application February 1, 1944, Serial No. 520,641

13 Claims. (Cl. 77—69)

This invention relates to rotary cutting tools, and more particularly to means for supporting the cutter elements of such tools.

An object of the invention is to provide an improved rotary cutting tool for cutting through a considerable thickness of plate, wherein the cutter elements of the tool, which are strongly backed, while readily individually removable for sharpening, regrinding, etc., are positively held against shifting radially (laterally of the backing) during use of the tool.

This is accomplished by shaping the cutting elements and the backing members therefor so that one nests into the other. The arrangement is such that the cutting elements are held in position by conveniently removable screws, yet the mounting does not rely on the screws for supporting the cutters to prevent lateral movement thereof.

A feature of the invention is the provision of a nesting engagement between the cutter and backing member as above set forth which is simple and economical to produce. In the embodiment shown the cutter, which has an elongate shank, is ground so that it can be set in a position where it presents a corner of the shank for engagement with the backing member, and the latter is provided with a V-groove which receives and nests the corner of the cutter shank. The backing member is of heavy construction, having cylindrical inner and outer surfaces so that it withstands lateral or radial pressures to a considerable degree, and this rigidity is advantageously imparted to the cutter through the medium of the corner thereof nesting in the groove of the member. By this construction the shape of the cutter shank need not be complicated, and as a result new cutters may be readily prepared from rectangular bar stock with but simple grinding operations, and replaced in the tool with a minimum of time and cost.

Another feature of the invention is the provision, for the cutter elements of a rotary tool, of supporting and stiffening means which function to prevent lateral movement even though the cutter shanks are mounted slightly out-of-parallel with the axis of rotation of the tool. As a result of this arrangement the shape of the cutter may be further simplified by taking advantage of the fact that workpieces of different hardness call for different slopes or rakes at the cutting edge. When the tool is to be used exclusively to cut soft materials, which call for a greater rake angle, the head is made to support the shanks in a forwardly inclined position so as to minimize the amount of slope or rake that has to be ground into the cutter. Where hard materials are to be cut, calling for a lesser rake angle, the tool head is arranged to support the cutter shanks in a rearwardly inclined position providing a more substantial mounting, and the amount of rake that has to be ground into the cutter is still not very great.

Other features and advantages will hereinafter appear.

In the accompanying drawing:

Figure 1 is a side elevation of a rotary cutting tool made according to the invention.

Fig. 2 is an end elevation of the tool of Fig. 1, looking at the cutting end.

Fig. 3 is an elevation of the base end of the cutter head, partly in section along lines 3—3 of Fig. 1.

Fig. 4 is a fragmentary section on the line 4 of Fig. 1.

Fig. 5 is a side elevation of a cutter of the tool.

Fig. 6 is an end view of the cutter, taken from the cutting end.

Fig. 7 is a front edge elevation of the cutter, and

Fig. 8 is a side elevation of a modified form of the tool of the present invention.

Referring to Figs. 1, 2 and 3, illustrating a rotary cutting tool exemplifying the invention, a driving spindle 10 carries a cutter head 11 having cutters 12, 13 and 14, and a pilot drill 15, the latter being held by a set screw 15a. The head 11 has a central bore to receive the spindle 10, and may be keyed to the latter to be driven thereby in any suitable manner, that shown comprising a plurality of shear pins 16 extending from the head to a flange 17 of the spindle.

To hold the head 11 on the spindle 10 a set screw 18 is provided, the tip of which bears against the latter.

For the purpose of conveniently mounting the cutters 12, 13 and 14, the head 11 is surfaced at three points 19, 20 and 21 around its sides, each surface being at an angle of 60° from the other two, and being parallel to the axis of the spindle 10. The surfaces 19, 20 and 21 are provided with grooves 22, 23 and 24 respectively in which are carried the cutters 12, 13 and 14, the latter being each held by washers 25 on screws 26 threaded into the head 11. As thus mounted the cutters are adjustable, and may be advanced to compensate for wear, sharpening, etc.

According to the present invention there are provided improved simplified means for backing and supporting the cutters 12, 13 and 14 to prevent both yielding and lateral or radial movement of these during operation of the tool. In accomplishing this the cutters are shaped, and are positioned on the head 11 in a novel manner, and the latter is provided with a backing member for each cutter which is formed to nest the cutter shank. As a result, each cutter is strongly backed to prevent yielding and chatter, and also restrained from moving radially so that it makes a precisely circular cut during operation of the tool.

As shown in Figs. 1 through 7, the cutters 12, 13 and 14 have shanks 27, 28 and 29 respectively, with respective bases 30, 31 and 32, the latter fitting closely in the grooves 22, 23 and 24, and being of rectangular cross-section which may be of a stock size, since no parts of the cutters exceed this size. The cutter shank 27 has a leading surface 33, a trailing surface 34 and an inside surface 35, the latter two surfaces forming the back of the cutter.

In making the cutter 12 for example Figs. 5, 6 and 7, a bar of suitable length is prepared, having a rectangular cross section equal to that of the base 30. The leading surface 33 of the shank 27 is ground in at an angle with respect to the trailing surface 34, so that said surfaces are nonparallel, and I have found that an angle of 5° is satisfactory in this connection. When the cutter 12 is mounted for use on the head 11, the leading surface 33 of the cutter, at the cutting tip, is located so that it lies in the radial line AB (Fig. 2) from the axis of the spindle 10. In order to do this, the leading side of the groove 22 may not coincide with a radial line CD perpendicular to the facing 19 of the head, but must be spaced an extent back of this line. The head 11 is provided with backing members 36, 37 and 38 for the cutters 12, 13 and 14 respectively, the backing members being in the form of curved fins broad at their bases and narrowed at their ends. By locating the cutter 12 on the head 11 in the manner described, the backing member 36 may be arranged so that the leading edge-surface thereof will engage the trailing inside corner 39 of the cutter shank 27. This edge-surface of the backing member may be formed of two intersecting planar surfaces 40 and 41, which will coincide with the surfaces 34 and 35 respectively of the cutter shank 27, and therefore nest the corner 39 of the latter.

As thus arranged, the backing member 36 strongly supports the cutter 12 and prevents same from yielding backward under the stress of the cutting. Also, the surface 41 of the member prevents transverse movement of the cutter 12, inwardly of the head and the surface 40 prevents transverse movement thereof outwardly of the head. Due to the apparent sharp angle the surface 41 makes with the tangent, designated by the letters EF (Fig. 2), to the line of cutting of the cutter 12, it is obvious that the latter is prevented by the backing member 36 from moving radially inward. However, a closer investigation of the functioning of the surface 40 of the backing member in preventing outward radial movement of the cutter 12 seems desirable at this point. As before noted, the trailing surface 34 of the cutter and the leading surface 33 are not parallel, being inclined at an angle of 5°. The latter surface is perpendicular to the tangent EF of the line of cutting, and also contains the line AB which extends radially from the axis of the spindle 10. Thus outward radial movement of the cutter 12, the tendency to which naturally results from the turning motion, as indicated by the arrow, imparted to the head 11, would have to follow the line AB. However, the contacting surfaces 40 and 34 of the backing member and cutter respectively are inclined at an angle of 5° to the line AB, in a direction which prevents such movement of the cutter. I term this 5° angle the retention angle R of the cutter shank 27, it being measured between the surfaces 33 and 34 thereof, see Fig. 6.

If the tangent EF to the line of cutting is extended to intersect the line or plane GH (Fig. 2) including the contacting surfaces 40 and 34 of the backing member and cutter respectively, the angle of intersection L, measured on the leading side of the line GH would be greater than a right angle, and the less the value of the retention angle R of the cutter shank 27, the closer the angle of intersection L approaches a right angle. If the tangent EF to the line of cutting is extended to intersect the line or plane IJ including the contacting surfaces 41 and 35 of the backing member and cutter respectively, the angle M at the intersection would be less than a right angle.

In a similar manner the backing members 37 and 38 nest the trailing inside corners of the cutter shanks 28 and 29 respectively, and reinforce and support the cutters 13 and 14 to prevent chatter and lateral or radial movement thereof. It will be seen also that the cutters 12, 13 and 14 are readily removable for replacement, and may be adjusted or advanced to compensate for wear and for sharpening.

As shown in Fig. 6 the cutter 12 has its outside face 42 ground to a section of a cylindrical surface to provide clearance for the work, the foremost portion 35a of the inside surface 35 being also ground for the same purpose. For the purpose of minimizing drag during cutting, I prefer to grind the surfaces 42 and 35a so that the thickness of the shank 27 between these surfaces is slightly less at its center than at the cutting tip, and a total difference of .002″ in the thicknesses at these two points has proved to be satisfactory. This difference is divided equally so that each of the surfaces 42 and 35a is ground to account for .001″ less thickness of the shank 27 at its center.

The cutters 13 and 14 are made in a manner similar to that described for the cutter 12, except for the cutting tips. In order that each of the cutters shares the cutting load, the tip of the cutter 12 is ground so that it cuts a V-groove which defines the outermost limits of the total cut, the cutter 14 ground to cut a V-groove which defines the innermost limits of the total cut, and the intermediate cutter 13 ground to cut a V-groove intermediate the innermost and outermost limits. The tip of the cutter 12 is advanced beyond that of the cutter 13 so that it initiates the cut, and the tip of the cutter 13 advanced beyond that of the cutter 14. Preferably, the pilot drill 15 is set so that the outer edges of the cutting lips are advanced approximately $\frac{1}{16}$″ ahead of the cutting tip of the cutter 12.

The leading surfaces of the cutters 12, 13 and 14 are ground at the cutting tips to provide true rakes or slopes, as the rake 43 (Fig. 5) of the cutter 12, extending in the path of the chip flow. For hard materials the value of the angle N of rake is normally smaller than the value used for soft materials. I have found it to be advantageous, in connection with the construction of cutters and backing members described herein as exemplifying the present invention, to control the rake angle of the cutters in part by giving the latter an angular setting wherein the shanks thereof extend in a direction tangent to either a left hand or right hand helix of small angle, centered in the axis of the spindle 10. By doing this, a tool may be made up to cut soft material only, and the cutters, by being set with the shanks extending along a right-hand helix, need be given less of a rake angle than if they were set straight, parallel to the axis of rotation. Or if the tool is to be used exclusively for cutting hard materials, a stronger anchorage for each of the cutters would result from setting the shanks to extend along a left-hand helix, and due to the material calling for a comparatively small rake angle, the actual angle that is grounded in the cutter, while larger than if the cutter were set straight, is still not excessive.

Referring to Fig. 1, the cutters 12, 13 and 14 are set so that the shanks extend along a left-hand helix, and I have found that a helix angle P of 1° is satisfactory when the tool is to be used to cut hard materials, including hardened steel. In Fig. 8 the cutters are set in the head 11a so that the shanks extend along a right-hand helix, and when arranged thusly, again with a helix angle of 1° the tool cuts soft materials such as soft steel, aluminum, etc. very satisfactorily.

To insure positive positioning of the cutters 12, 13 and 14 a plurality of pins 44, 45 and 46 are carried by the head 11 to engage the cutter bases 30, 31 and 32 respectively. The positions of the cutters may be adjusted by means of shims inserted between the pins and bases, or by grinding off the latter, as required.

The cutting tool of the present invention may be used with or without the pilot drill 15. If the work to be cut is not too tough, and is mounted rigidly with respect to the mounting for the spindle 10, the drill may be dispensed with. Or a pilot hole may be drilled in the work first, and the drill 15 replaced with a length of drill rod for a pilot. Preferably the drill 15 has flutes, the cutting margins of which are not raised, so that the outer surfaces of the flutes conform to a true right cylinder.

The term "nest" or "nesting" as used herein means the interfitting of portions of the cutter blade and backing member so as to provide angular contacting portions extending transversely of the radius passing through said surfaces. As for example, the surfaces 34, 35 on the back of the cutter blade engage the backing surfaces 40, 41 along the line or plane GH and IJ both of which are angularly disposed to the radius of the device and hold the cutter blade against radial movement when the line GH forms an angle of more than 90° with tangent EF to the line of cutting measured on the leading side of the plane.

Variations and modifications may be made within the scope of this invention and portions of the improvements may be used without others.

I claim:

1. A rotary cutter having a head adapted to be fastened to a driving spindle to be rotated thereby; and a cutting member projecting beyond the end thereof and having an elongate shank mounted on the head to extend in a direction substantially parallel to the axis of rotation thereof, said head having a backing member projecting beyond the end thereof and engaging the back of the cutting member, one of said members nesting the other so that radial movement of the cutting member is restrained when the tool is cutting.

2. A rotatable cutting tool having a head adapted to be fastened to a driving spindle to be rotated thereby; and a cutter having an elongate shank eccentrically mounted on the head to extend in a direction substantially parallel to the axis of rotation thereof, said cutter projecting beyond the end of the head and having a backing member projecting from the end thereof with a leading edge engaging the back of the cutter and formed to nest the latter and restrain radial movement thereof when the tool is cutting.

3. A rotatable cutting tool having a head adapted to be fastened to a driving spindle to be rotated thereby; and a cutter having an elongate shank eccentrically mounted on the head to extend in a direction substantially parallel to the axis of rotation thereof, said head having a backing member with a leading portion engaging the back of the cutter and formed to nest the latter and restrain radial movement thereof when the tool is cutting, the nest of the backing member being formed by two surfaces which intersect in a straight line noncoincident with and substantially parallel to the axis of rotation of the head, one of said surfaces being planar and lying outside of the space enclosed by the surface of revolution defined by said intersection during rotation of the head, the plane of said planar surface intersecting a tangent to the line of cutting of the cutter at an angle, measured on the leading side of the plane, which is greater than a right angle.

4. A rotatable cutting tool having a head adapted to be fastened to a driving spindle to be rotated thereby; and a cutter having an elongate shank eccentrically mounted on the head to extend in a direction substantially parallel to the axis of rotation thereof, said head having a backing member with a leading portion engaging the back of the cutter and formed to nest the latter and restrain radial movement thereof when the tool is cutting, the nest of the backing member being formed by two surfaces which intersect in a straight line noncoincident with and substantially parallel to the axis of rotation of the head, one of said surfaces being planar and lying inside of the space enclosed by the surface of revolution defined by said intersection during rotation of the head, the plane of said planar surface intersecting a tangent to the line of cutting of the cutter at an angle, measured on the leading side of the plane, which is less than a right angle.

5. A rotatable cutting tool having a head adapted to be fastened to a driving spindle to be rotated thereby; and a cutter having an elongate shank mounted on the head to extend along a tangent to a right-hand helix about the axis of rotation of the head, the latter having a backing member with a leading edge engaging, and formed so that it nests, the back of the cutter to restrain radial movement thereof when the tool is cutting.

6. A rotatable cutting tool having a head adapted to be fastened to a driving spindle to be rotated thereby; and a cutter having an elongate shank mounted on the head to extend along a tangent to a left-hand helix about the axis of rotation of the head, the latter having a backing member with a leading edge engaging, and formed so that it nests, the back of the cutter to restrain radial movement thereof when the tool is cutting.

7. The invention as defined in claim 2, in which the cutter comprises a bar of polygonal section having planar non-parallel leading and trailing surfaces, the latter surface lying in the same plane with, and engaging part of the nesting surface of the backing member, and the leading cutter surface being radial to the line of cutting of the cutter.

8. The invention as defined in claim 2, in which the cutter comprises a bar of polygonal section having planar trailing and inside surfaces which engage the nest of the backing member.

9. A rotatable cutting tool having a head adapted to be fastened to a driving spindle to be rotated thereby; and a cutter having an elongate shank mounted on the head to extend in a direction substantially parallel to the axis of rotation thereof, said head having a backing member with a portion engaging the cutter, said portion having a surface disposed at less than a right angle with respect to a plane parallel to said axis and containing the tangent to the cutting line of the cutter and another surface disposed at more than a right angle, measured on the leading side of said plane, with respect to said plane.

10. A rotatable cutting tool body having a head adapted to be fastened to a driving spindle to be rotated thereby; and a cutter having an elongate shank mounted on the head to extend in a direction substantially parallel to the axis of rotation thereof, said head having a backing member provided with a V-shaped groove engaging coacting surfaces on the back of the cutter to nest the same therein and press against the same with the apex of the V disposed within the cutting zone of the cutter.

11. A rotatable cutting tool body having a head adapted to be fastened to a driving spindle to be rotated thereby; and a cutter having an elongate shank mounted on the head to extend in a direction substantially parallel to the axis of rotation thereof, said head having a backing member having an apexed groove engaging coacting surfaces on the back of the cutter to nest the same therein and press against the same with the apex of the groove disposed within the cutting zone of the cutter.

12. A rotatable cutting tool body having a head adapted to be fastened to a driving spindle to be rotated thereby; and a cutter having an elongate shank mounted on the head to extend in a direction substantially parallel to the axis of rotation thereof, said head having a backing member provided with a portion engaging the back of the cutter to nest the same therein and press against the same, the cutter-engaging face of said portion of the backing member having opposed angularly related surfaces disposed in the cutting zone of the cutter and holding the cutter against shifting laterally with respect to the head.

13. A trepanning tool body having a head adapted to be fastened to a driving spindle to be rotated thereby; and one or more cutters carried by the head to project from one end thereof having an elongate shank mounted on the head to extend in a direction substantially parallel to the axis of rotation thereof, said head having a projecting backing member for each cutter engaging the back of the cutter to nest the same therein and press against the same, the cutter-engaging portion of the backing member having opposed angularly related surfaces disposed within the cutting zone of the cutter and holding the cutter against shifting laterally with respect to the head.

ANDREW S. FODOR.